United States Patent [19]

Ishii et al.

[11] Patent Number: 5,659,332
[45] Date of Patent: *Aug. 19, 1997

[54] DISPLAY UNIT OF INPUT INTEGRAL TYPE

[75] Inventors: Yutaka Ishii, Nara; Yoshitaka Yamamoto, Yamato-Koriyama, both of Japan

[73] Assignee: Sharp Kabushiki Kaisha, Osaka, Japan

[*] Notice: The term of this patent shall not extend beyond the expiration date of Pat. No. 5,461,400.

[21] Appl. No.: 361,844

[22] Filed: Dec. 21, 1994

Related U.S. Application Data

[63] Continuation of Ser. No. 65,711, May 21, 1993, abandoned.

[30] Foreign Application Priority Data

May 29, 1992 [JP] Japan .................................. 4-139145

[51] Int. Cl.$^6$ .................................................... G09G 3/18
[52] U.S. Cl. ......................... 345/104; 345/175; 345/182; 349/12
[58] Field of Search ........................... 345/104, 87, 173, 345/175, 176, 180, 183, 182; 358/901.1; 340/815.42; 178/18, 19; 385/42, 48, 49, 131, 132, 901; 40/448; 359/55, 56; 349/12, 193

[56] References Cited

U.S. PATENT DOCUMENTS

| | | | |
|---|---|---|---|
| 3,944,740 | 3/1976 | Murase et al. | 345/175 |
| 4,405,921 | 9/1983 | Mukaiyama | 345/182 |
| 4,640,592 | 2/1987 | Nishimura et al. | 345/60 |
| 4,785,564 | 11/1988 | Gurtler | 345/168 |
| 4,930,874 | 6/1990 | Mitsummune et al. | 345/92 |
| 4,945,348 | 7/1990 | Ibamoto et al. | 345/104 |
| 5,003,167 | 3/1991 | Arques | 345/175 |
| 5,009,483 | 4/1991 | Rockwell | 358/901 |
| 5,144,416 | 9/1992 | Hart | 358/56 |
| 5,396,351 | 3/1995 | Gessel | 385/131 |
| 5,414,413 | 5/1995 | Tamaru et al. | 345/173 |
| 5,461,400 | 10/1995 | Ishii et al. | 345/182 |

FOREIGN PATENT DOCUMENTS

| | | | |
|---|---|---|---|
| 0485235 | 5/1982 | European Pat. Off. | 345/87 |
| 0 384 509 | 8/1990 | European Pat. Off. | |
| 56-161521 | 12/1981 | Japan . | |
| 57-137928 | 8/1982 | Japan | 345/181 |
| 59-119320 | 7/1984 | Japan . | |
| 59-129892 | 7/1984 | Japan . | |
| 60-077229 | 5/1985 | Japan | 345/175 |
| WO90/06568 | 6/1990 | WIPO . | |

OTHER PUBLICATIONS

Patent Abstracts of Japan, Vo. 016, No. 393—JP-A-41 27 313 (Aug. 1992).
Patent Abstracts of Japan, vol. 013, No. 448—JP-A-11 73 016 (Oct. 1989).

*Primary Examiner*—Richard Hjerpe
*Assistant Examiner*—Lun-Yi Lao
*Attorney, Agent, or Firm*—David G. Conlin; George W. Neuner

[57] ABSTRACT

A display unit of an input integral type has a display panel provided with a liquid crystal as a display medium. In the display unit, an optical waveguide is integrally formed in the shape of a matrix and approximately guides light having a predetermined wavelength in parallel with a surface of a display substrate.

33 Claims, 7 Drawing Sheets

DISPLAY UNIT OF INPUT INTEGRAL TYPE

This is a continuation of application Ser. No. 08/065,711 filed on May 21, 1993 is now abandoned.

BACKGROUND OF THE INVENTION

1. Field of the Invention

The present invention relates to a display unit of an input integral type for a handwriting input used in an office automation (OA) equipment and an audio visual device.

2. Description of the Related Art

Recently, requirements for a display unit having a large size and a large display capacity have been increased as an information-oriented society is advanced. A cathode ray tube (CRT) called the present king of a display is developed to satisfy these requirements. The CRT is more precisely constructed and is large-sized in development. For example, the CRT approximately has a size of 40 inches at its maximum in the case of a direct viewing type and has a size of 200 inches at its maximum in the case of a projecting type.

However, the problems of a weight and a depth of the CRT are more serious in realization of the display unit having a large-sized structure and a large capacity. According, it is very desirable to provide a method for basically solving these problems.

A plane type display unit performs a displaying operation using a displaying principle different from that of the general CRT. The plane type display unit is steadily researched to provide a high display quality required for a high vision and a display for a high performance engineering work station (EWS) although the plane type display unit at the present time is widely used for a word processor, a personal computer, etc.

For example, the plane type display unit is constructed by an electroluminescent panel (ELP), a plasma display panel (PDP), a fluorescent display tube (VFD), an electronic display unit (ECD), a liquid crystal display unit (LCD), etc. In these display units, etc., the liquid crystal display unit (LCD) is most promising in consideration of easiness of realization of a full color and matching with a large scale integrated circuit (LSI). Accordingly, a technique of the LCD is most greatly advanced.

The LCD is generally divided into an LCD of a simple matrix driving type and an LCD of an active matrix driving type. The LCD of a simple matrix driving type has a structure for sealing a liquid crystal into an XY matrix type panel in which a pair of glass substrates are opposed to each other such that electrodes each formed in the shape of a stripe are perpendicular to each other. The LCD of a simple matrix driving type performs a displaying operation by using rapid responsive display characteristics of a liquid crystal.

In contrast to this, the LCD of an active matrix driving type has a structure for directly adding a nonlinear element to a picture element. The LCD of an active matrix driving type performs a displaying operation by positively using nonlinear characteristics such as switching characteristics of each of elements. Accordingly, no LCD of an active matrix driving type greatly depends on the display characteristics of a liquid crystal in comparison with the LCD of a simple matrix driving type. Accordingly, it is possible to realize a display unit providing a high contrast and a high speed response.

The above nonlinear element is divided into nonlinear elements of two and three terminal types. The nonlinear element of a two-terminal type has a structure of metal-insulator-metal (MIM), a diode, etc. In contrast to this, the nonlinear element of a three-terminal type has a thin film transistor (TFT), a silicon metal oxide semiconductor (Si-MOS), silicon-on-sapphire (SOS), etc.

In view of uses of the LCD in their markets, a lap top personal computer and a palm top personal computer having the LCD of a simple matrix driving type and the LCD of an active matrix driving type are promising as goods for extending the markets.

In particular, an input device of information in important in a portable information remote terminal such as the palm top personal computer. In this input device of information, a handwriting input function is strongly required to omit a space for a keyboard.

In the general display unit, a tablet digitizer is mainly arranged outside a liquid crystal panel to fulfill this handwriting input function so that the inputting position of a pen is detected by a tablet. This tablet is constructed by an electromagnetic induction system, an electromagnetic giving-receiving system, a resistance pressure sensitive system, an electrostatic coupling system, an acoustic system, an optical system, etc.

FIG. 1 shows one example of a tablet of an electromagnetic induction system.

As shown in FIG. 1, the tablet is constructed by a conductive pattern 1 and an exciting or cursor coil 2.

When diodes 5 are sequentially turned on by an X-axis ring counter 3 and a Y-axis ring counter 4, a voltage corresponding to each of these diodes is outputted from a common terminal M. When an alternating current signal is simultaneously applied to the cursor coil 2, an induced electromotive force is generated on a scanning line.

As a result, a composite wave provided by combining the turning-on voltage with the induced electromotive force is generated from the common terminal M. The composite wave is A/D-converted and is additionally inputted to a maximum value detecting circuit. This maximum value detecting circuit has a function for detecting a maximum amplitude value of the composite wave. The maximum value detecting circuit also has a function for selecting a larger one of electromotive forces on right-hand and left-hand scanning lines adjacent to a scanning line corresponding to the maximum amplitude value. Thus, it is possible to detect a cursor position by these functions.

FIG. 2 shows one example of a tablet of an electromagnetic giving-receiving system.

This electromagnetic giving-receiving system includes a tablet 6, an address portion 9 connected to the tablet 6, a giving-receiving selector 10, a sensor 11 and a driver 12. The sensor 11 and the driver 12 are connected to a controller 13 and are selectively connected by the selector 10 to the address portion 9.

An alternating current is applied onto a matrix line on the tablet 6 so that electromotive force is absorbed into a resonance circuit or coil 8 arranged within an indicator 7. At the next moment, the matrix line of the tablet 6 functions as a sensor and detects an electromagnetic wave generated by the resonance circuit or coil 8 within the indicator 7.

FIG. 3 shows one example of a tablet of a resistance pressure sensitive system.

This resistance pressure sensitive system has an interlocking switch 19. Two resistor sheets 14 and 15 respectively have electrodes 17 and 18 and are stuck to each other with a clearance. The sheets 14 and 15 come into contact with each other by applying pressure onto these sheets so as to generate an electric potential. X and Y coordinates of this pressure are detected by the generated potential. Namely, a direct current voltage is applied to the resistor sheet 15 for an X-axis and a voltage generated by pressure in the resistor sheet 14 for a Y-axis is taken out so that an X-coordinate of this pressure is detected. The X and Y coordinates of pressure are alternately detected by applying voltages to the sheets on the X and Y axes by time division.

FIG 4 shows one example of a tablet of an electrostatic coupling system.

In this electrostatic coupling system, rectangular waves having different phases are applied to both ends of electrodes 21 and 22. Positions of an optical pen 24 on X and Y axes are alternately detected by a switch 23. The pen 24 is electrically connected to a phase detecting circuit 27 through an amplifier 25 and a filter 26. X and Y coordinates of the pen 24 are provided by detecting a signal phase determined by the position of an ITO film 28 through the pen 24.

In a tablet of an acoustic system, the position of an optical pen is provided by detecting a propagation time of a sound wave transmitted in the air or a surface wave propagated on a tablet surface, and an arrival time of a reflected wave.

In a tablet of an optical system, a light emitting element is arranged on one of X and Y axes and a light receiving element is arranged on the other so as to detect a light interrupting position.

The above-mentioned tablet detecting systems have the following disadvantages.

(1) In the electromagnetic induction system, relatively high resolution can be obtained, but power consumption is large and the weight of a display unit is heavy and the display unit tends to be influenced by a magnetic field.

(2) In the electromagnetic giving-receiving system relatively high resolution can be obtained, but power consumption is large as a demerit.

(3) In the resistance pressure sensitive system, cost of the display unit is reduced in comparison with the other tablet detecting systems, but there is a problem about the uniformity of a resistance value and resolution is bad and the sheets tend to be damaged so that durability of the display unit is bad.

(4) In the electrostatic coupling system, relatively high resolution can be obtained, but it is difficult to set the pen 24 to be wireless and power consumption is relatively large. Further, the display unit tends to be influenced by static electricity.

(5) In the acoustic system, the structure of a detecting circuit is complicated and the display unit tends to be influenced by a circumferential environment.

(6) In the optical system, resolution of the display unit is bad.

As mentioned above, it is impossible to sufficiently provide a satisfactory display unit in each of the above-mentioned tablet detecting systems. Further, each of these tablet detecting systems is arranged in an upper or lower portion of a liquid crystal panel so that inputting and displaying positions of characters, etc. are shifted from each other in accordance with a parallax.

SUMMARY OF THE INVENTION

It is therefore an object of the present invention to provide a display unit of an input integral type in which the display unit has small power consumption and light weight and is not easily influenced by a magnetic field, static electricity and a circumferential environment, and resolution and durability of the display unit are improved and the display unit has a detecting circuit having a simplified structure and no inputting and displaying positions are shifted from each other in accordance with a parallax.

The above object of the present invention can be achieved by a display unit of an input integral type comprises a display panel provided with a liquid crystal as a display medium and an optical waveguide integrally formed in the shape of a matrix, the optical waveguide approximately guiding light having a predetermined wavelength in parallel with a surface of a display substrate.

In the above display unit, an optical waveguide is integrally formed in the shape of a matrix and approximately guides light having a predetermined wavelength in parallel with a surface of a display substrate. Accordingly, the position of an optical pen can be detected by an inputting operation thereof. Further, the optical waveguide having the matrix shape can be formed between display picture elements so that a numerical aperture in display can be improved. Further various kinds of processing circuits such as a handwriting position detecting circuit, a character recognizing circuit, etc. can be integrated on a glass substrate or a silicon monocrystal substrate so that a very compact display unit can be realized.

In accordance with the present invention, in a general system for laminating a tablet with a display panel, it is possible to solve the problems with respect to thickness, weight and power consumption of the display unit, an accuracy in display position in accordance with a parallax, wireless of the optical pen and bad influences of changes in environment of magnetic and electrostatic fields on display. Accordingly, the present invention can be widely applied to various kinds of office automation (OA) equipments using a computer such as a lap top personal computer, a word processor, etc. In particular, the display unit of an input integral type in the present invention can be most effectively used for a compact portable remote terminal such as palm top computer, an electronic pocket notebook, etc.

Further, objects and advantages of the present invention will be apparent from the following description of the preferred embodiments of the present invention as illustrated in the accompanying drawings.

DESCRIPTION OF THE PREFERRED EMBODIMENTS

The preferred embodiments of a display unit of an input integral type in the present invention will next be described in detail with reference to the accompanying drawings.

In accordance with the present invention, an input device as a pen can be set to be wireless and optical waveguides in X-axis and Y-axis directions are formed on a substrate constituting a liquid crystal display element to realize low power consumption and high resolution and provide preferable environmental adaptation. Further, a light receiving element for sensing a predetermined optical signal is disposed in an end portion of each of the optical waveguides. An optical pen is used as the input device and is constructed by a light emitting element such as a laser, a light emitting diode (LED), etc.

Figure 9:
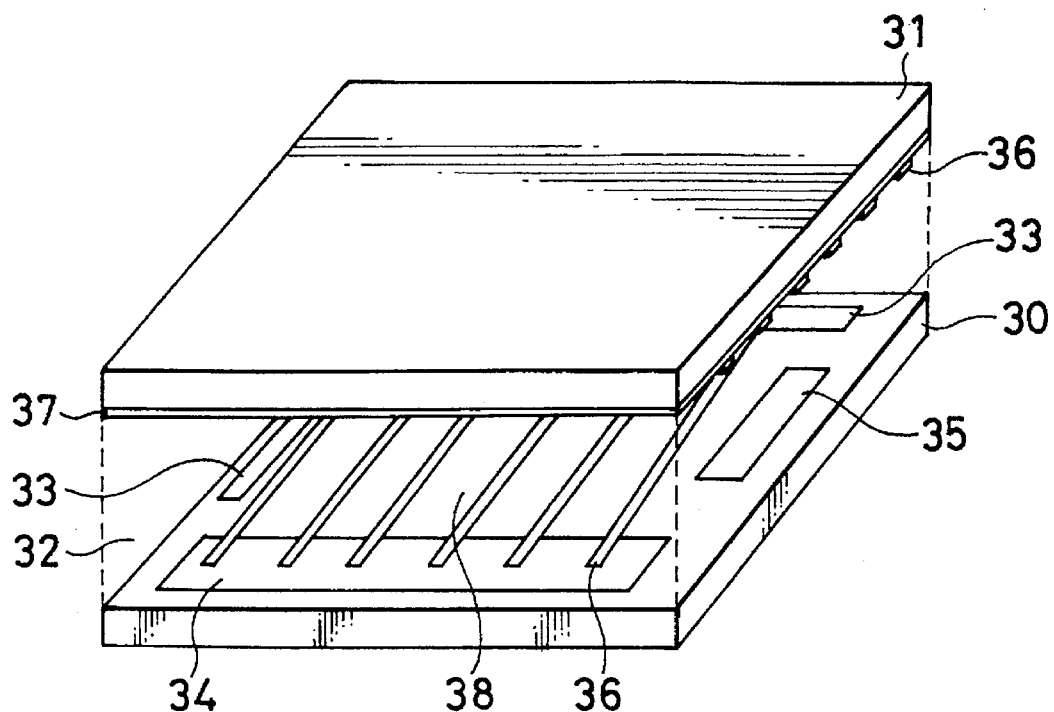
FIG. 9 is a perspective view showing a display unit of an input integral type in accordance with another embodiment of the present invention.

In FIG. 9, a silicon monocrystal substrate 30 and a glass substrate 31 are opposed to each other and a liquid crystal 32 is sealed into a clearance between the silicon monocrystal substrate 30 and the glass substrate 31. The silicon monocrystal substrate 30 has a liquid crystal driver portion 33 and an unillustrated active element as a picture element. The picture element is constructed by an electric circuit including a transistor and an electrode. The electric circuit is formed below a picture element electrode as a picture element electrode portion 38 described later. A transparent electrode 37 is uniformly formed on the glass substrate 31. An active matrix driving operation of the liquid crystal is performed between the silicon monocrystal substrate 30 and the glass substrate 31.

The picture element electrode portion 38 is formed on the silicon monocrystal substrate 30 and is also used as a reflecting electrode. There is no picture element between picture element electrode portions 38. An optical waveguide 36, an X(or Y)-sensor portion 34 and a Y(or X)-sensor portion 35 are formed in an X or Y direction between the picture element electrode portions 38.

The optical waveguide is formed by using an inorganic or organic material. For example, the inorganic material uses a laminated layer of $SiO_2$, $Si_3N_4$, $GeO_2$, $TiO_2$, etc., or an embedding structure of a glass fiber. The organic material uses polyimide, epoxy resin, polyurethane, PMMA, etc.

An optical waveguide in the Y or X direction is formed in the glass substrate 31 opposed to the silicon monocrystal substrate 30 such that this optical waveguide crosses the optical waveguide of the silicon monocrystal substrate 30 and is located in a substrate portion in which no picture element is formed.

The optical waveguide is formed from the inorganic material by using a chemical vapor deposition (CVD) method, a flame accumulating method, a sputtering method, etc. In the case of the glass substrate, the optical waveguide can be formed by an ion exchange method using heat and the application of an electric field. In a general method for manufacturing the optical waveguide, an inorganic salt including ions for doping of K, Ag, Ti, Cs, etc. is melted. For example, these ions are exchanged for ions of Na and F in the glass substrate to form a high refractive index portion.

The optical waveguide can be also formed by using an embedding structure in which an optical fiber is embedded into a groove after the groove is mechanically or optically formed in each of the substrates.

In the case of the organic material, the optical waveguide is formed by a spin coating method, a dipping method, a sol-gel processing method, etc. Further, to guide light, core and clad layers can be formed by orienting an electric field to break central symmetric properties of a polar molecule and a side chain polar group, thereby causing an optical nonlinear property. The core and clad layers can be also formed by using a change in refractive index caused by a difference in orientation of the electric field. The optical waveguide can be also formed by another method using the formation of an LB film. The optical waveguide can be further formed by an organic crystal constructed by using a solvent evaporation method and a melting method.

A photosensor is formed in an end portion of each of the optical waveguides on the silicon substrate in the X and Y directions. An end portion of the optical waveguide formed on the glass substrate in the Y or X direction is recessed or projected to leak a light onto the silicon substrate. The photosensor on the silicon substrate is formed in a position for receiving this leaked light.

The display unit of an input integral type is operated as follows.

When an optical pen having a light emitting element such as a laser, an LED, etc. comes in contact with an upper substrate, a light component having an incident angle in conformity with a light guiding condition with respect to light incident to a contact portion of the upper substrate is guided along an optical waveguide formed on the glass substrate and an optical waveguide formed on the silicon substrate such that this optical waveguide is perpendicular to the optical waveguide on the glass substrate. Thus, X and Y coordinates of the contact portion are determined by a photosensor located in each of X and Y positions of end portions of the optical waveguides.

In this case, one problem is to separate an optical output signal from circumferential light by the optical pen in consideration of an influence of the circumferential light.

To solve this problem, a wavelength of light of the optical pen is separated from a dominant wavelength of the circumferential light and a light output of the optical pen attains turning-on and turning-off states in accordance with specified frequency and light intensity. Further, the optical output signal can be separated from the circumferential light by sufficiently improving sensitivity of the photosensor to remove the influence of the circumferential light.

Figure 10:
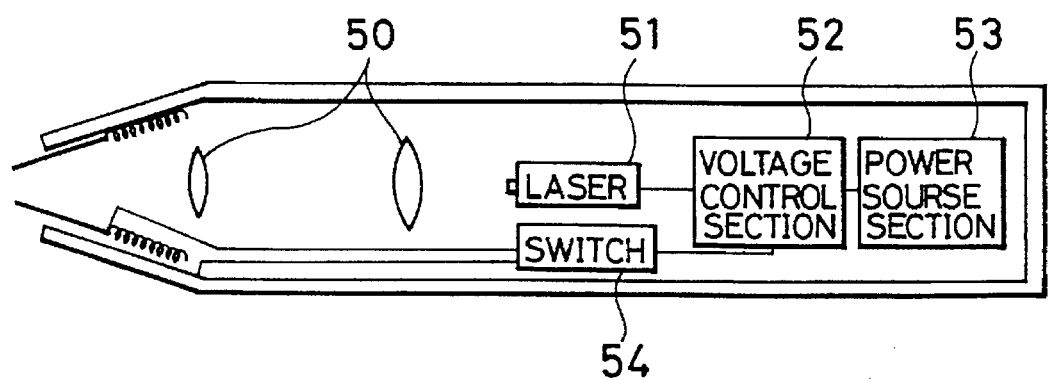
FIG. 10 is a view showing one example of the basic structure of an optical pen.

FIG. 10 shows one example of a basic structure of the optical pen using a laser.

The basic structure includes a lens 50, a laser 51, a voltage control section 52, a power source section 53 and a switch 54.

When the optical pen comes in contact with a liquid crystal panel, the switch 54 is turned on and light is emitted from the laser 51. This light is incident to a liquid crystal layer portion of the liquid crystal panel such that this light is focused in this liquid crystal layer portion. Namely, light formed in the shape of a small point is incident to the liquid crystal panel so that the number of waveguides for guiding this light in X and Y directions is small. It is possible to mechanically provide an additional function in which a focal point is defocused and a light spot having a large diameter is incident to the liquid crystal panel when the optical pen is strongly pushed. In this case, the number of waveguides for guiding light in the X and Y directions is greater than that in the case of the above small point.

Accordingly, in the input device of the present invention, it is possible to control the thickness of a character in accordance with a handwriting pressure although it is difficult to control this thickness in the general input device.

If a position of the optical pen can be detected, it is possible to realize a handwritten character recognizing device for recognizing a handwritten character in combination with a computer.

Figure 11:
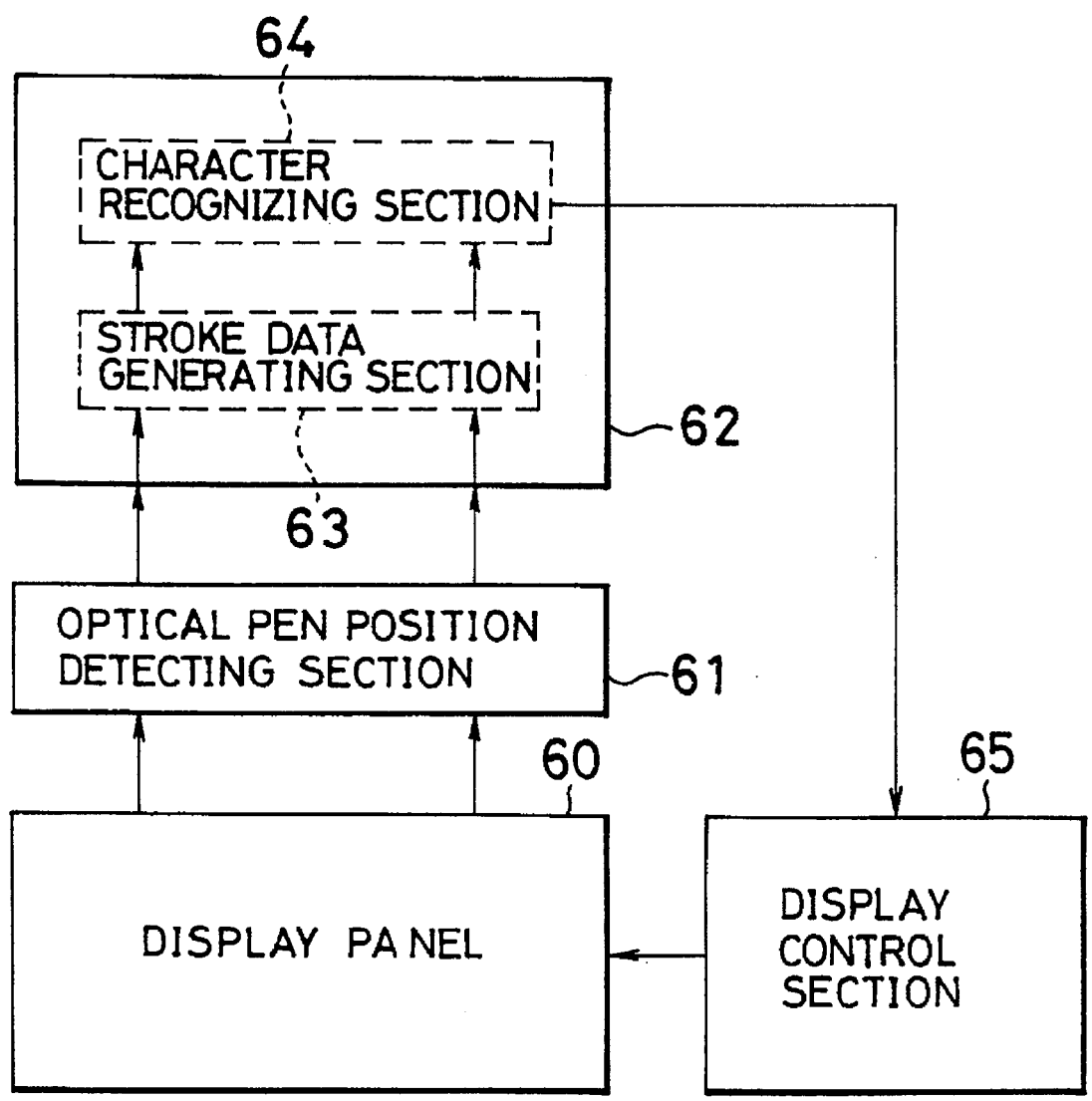
FIG. 11 is a block diagram showing one example of a device for recognizing a handwritten character.

FIG. 11 is a block diagram showing an embodiment of the construction of this handwritten character recognizing device.

As shown in FIG. 11, this handwritten character recognizing device has a display panel 60. A computer 62 includes a character recognizing section 64 and a stroke data generating section 63. An optical pen position detecting section 61 detects a position of the optical pen on the display panel 60 on the basis of a signal transmitted from the display panel 60 in accordance with light from the optical pen. The computer 62 recognizes characters, figures, marks, etc. on the basis of detected position data and displays the recognized characters, etc. on the display panel 60 through a display control section 65.

The optical pen position detecting section 61, the computer 62, the stroke data generating section 63 and the character recognizing section 64 can be integrated as a liquid crystal display (LCD). In particular, if a substrate is formed by using a silicon monocrystal, it is possible to provide a desirable display unit of an input integral type with high integration.

In accordance with the present invention, the position of an optical pen can be detected by forming an optical waveguide within a display panel. Further, a handwritten character, etc. can be recognized by combining the display unit with a computer. When the display unit is thick in a genera system for laminating a tablet panel with the display panel, the display unit becomes heavy and large power consumption is required and a large error in position accuracy is caused in accordance with a parallax. However, no such problems are caused in the present invention. Further, since an input pen can be wirelessly constructed, an inputting operation of the pen can be simplified and the size of a character can be selected by a handwriting pressure.

In the above embodiments of the present invention, the optical waveguide is formed on the silicon monocrystal substrate and the glass substrate. However, all waveguides in X and Y directions can be formed on the silicon monocrystal substrate or the glass substrate. Further, the present invention can be applied to a display element constructed by a pair of glass substrates as a liquid crystal panel. FIGS. 7a and 7b and FIGS. 8a and 8b show concrete examples of such structures. Reference numerals 70, 71, 72 and 73 respectively designate a silicon or glass substrate, a silicon substrate and a glass substrate and an optical waveguide.

Figure 7A:
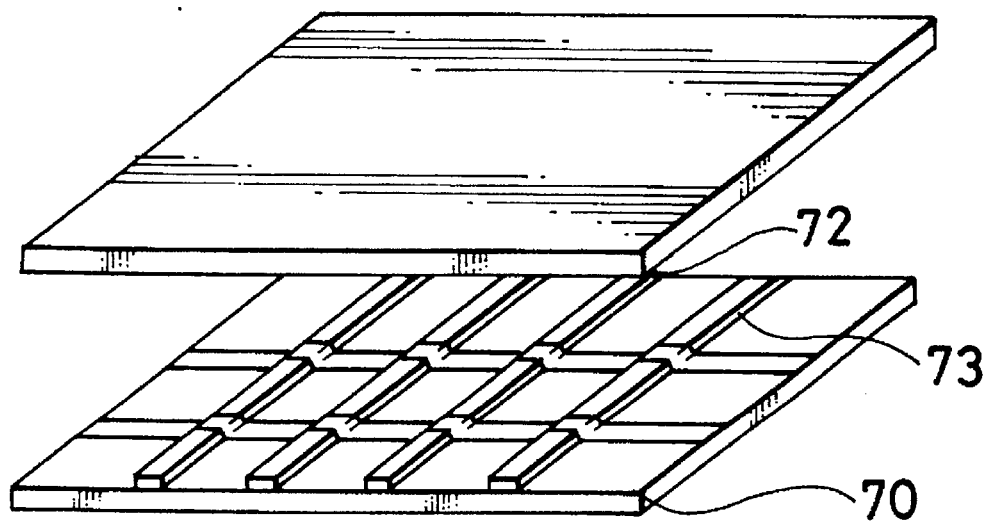
FIGS. 7a and 7b are view showing liquid crystal panels.

In FIG. 7a, optical waveguides 73 in X and Y directions are arranged on the silicon or glass substrate 70 such that these optical waveguides 73 cross each other. The glass substrate 72 is disposed on the optical waveguides 73.

Figure 7B:
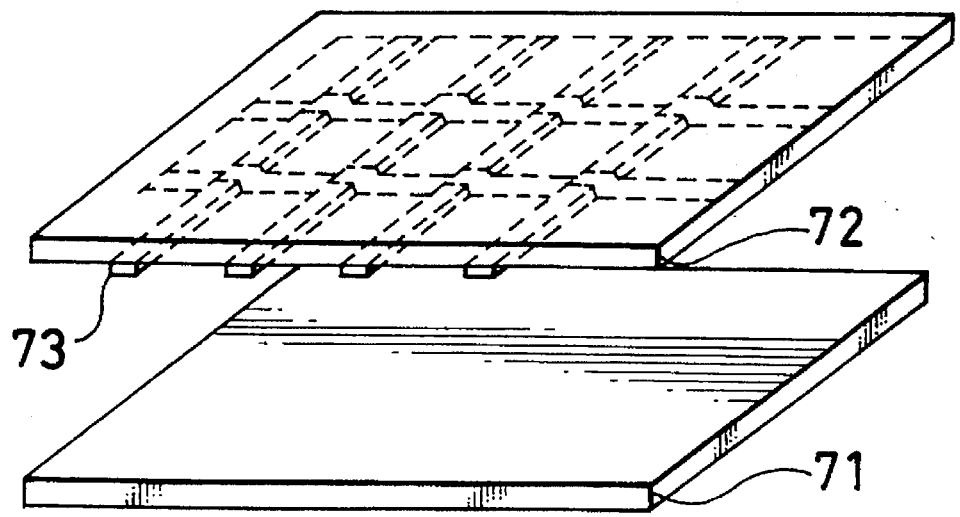

In FIG. 7b, optical waveguides 73 in X and Y directions are arranged on the glass substrate 72 formed on a silicon substrate such that these optical waveguides 73 cross each other.

Figure 8A:
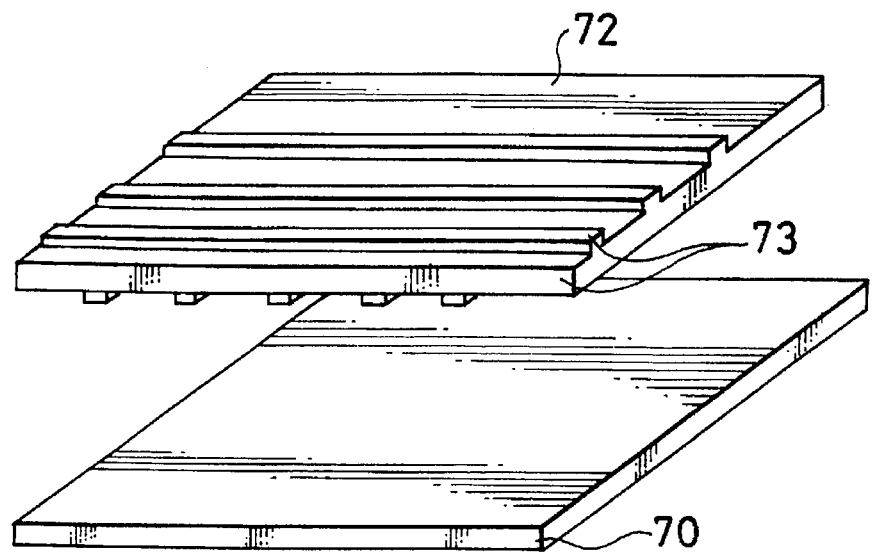
FIGS. 8a and 8b are views showing another liquid crystal panels.

In FIG. 8a, the glass substrate 72 is arranged on the silicon or glass substrate 70 and one optical waveguide 73 is arranged on one side of the glass substrate 72 facing the silicon or glass substrate 70. Another optical waveguide 73 is arranged on the other side of the glass substrate 72 such that these optical waveguides 73 cross each other.

Figure 8B:
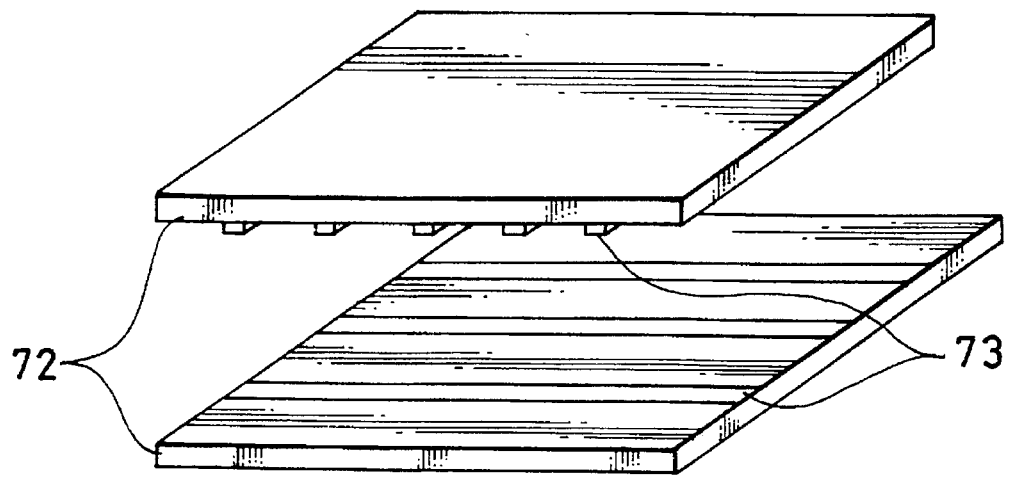

In FIG. 8b, optical waveguides 73 are respectively arranged on two opposite glass substrates 72 such that these optical waveguides 73 cross each other.

In view of a display driving method, the present invention in this embodiment can be applied to the above simple matrix driving method or the above active matrix driving method. In particular, the present invention in this embodiment can be preferably applied to the active matrix driving method in consideration of a display quality.

Further, a liquid crystal driver, various kinds of memory circuits, various kinds of functional circuits of a photosensor, etc. can be integrally formed with a transistor of a display picture element. Furthermore, another large scale integrated circuit (LSI) of a central processing unit (CPU), etc. can be easily formed with high integration. Accordingly, it is desirable to particularly apply the present invention to a liquid crystal display (LCD) of an active matrix type using a silicon monocrystal substrate.

Figure 6:
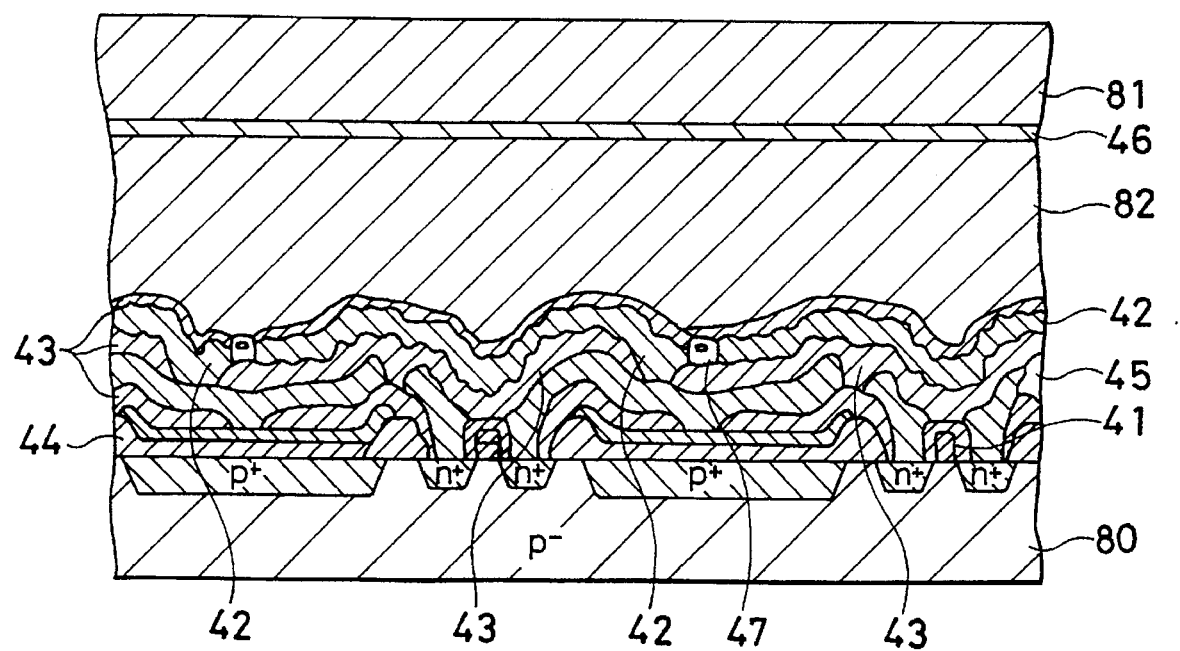
FIG. 6 is a cross-sectional view for explaining a switching element.

A switching element having an electrode structure of a reflecting type can be formed by using a MOS semiconductor process with respect to the silicon monocrystal substrate. FIG. 6 shows this electrode structure.

In this electrode structure, a storage capacitor is formed between a silicon substrate 80 and a p-type silicon film 41 through an insulating film. The storage capacitor is disposed as a means for supporting the hold of electric charges implanted into a picture element between a writing period and the next writing period.

A picture element electrode 42 is also used as a reflecting film and is made of aluminum (Al). The picture element electrode 42 is recessed and projected by coating an insulating layer 43 of SiNx below aluminum with a resist and photolithographing a surface of this resist.

Reference numerals 44, 45 and 46 respectively designate a field oxide film, a source line and a common electrode. Reference numerals 81 and 82 respectively designate a glass substrate and a liquid crystal. The number of picture elements is set to 240×380 and a screen size is set to 3 inches.

An optical waveguide 47 is formed as follows.

An $SiO_2$ layer is formed by sputtering and an $SiO_2$-$Ta_2O_5$ layer is then formed and patterned. Thereafter, an $SiO_2$ film is again formed by sputtering and is patterned.

In the above manufacturing method, an optical waveguide is formed in an X-axis direction in a portion of a silicon substrate in which there is no picture element. An optical waveguide is also formed in a Y-axis direction in a portion of a glass substrate in which there is no picture element. A photosensor is formed on the silicon substrate in an end portion of the optical waveguide and is connected to the optical waveguide on the silicon substrate in the X-axis direction through a light leaking portion.

Figure 1:
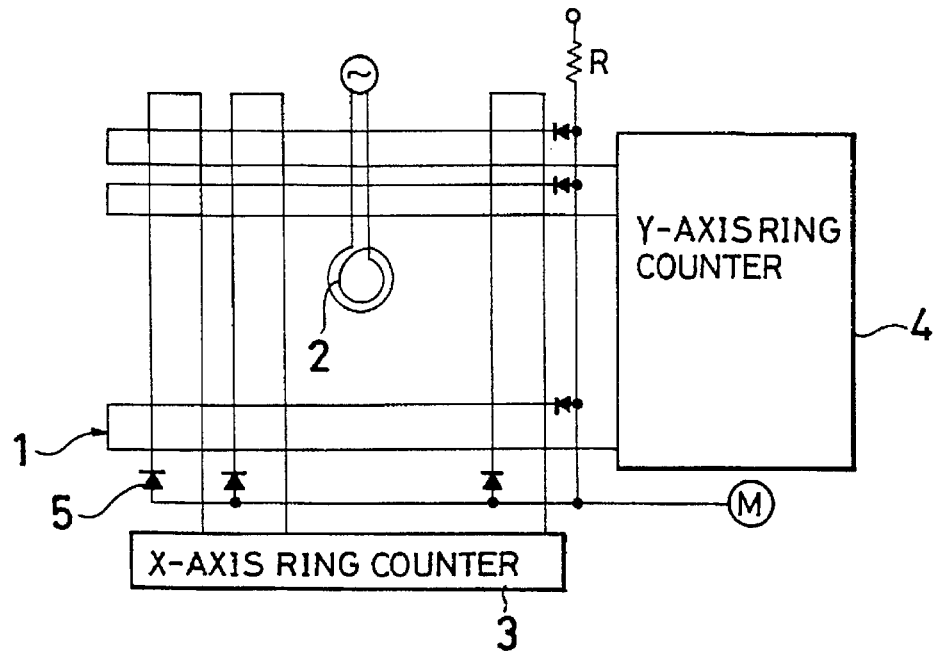
FIG. 1 is a view showing a tablet of an electromagnetic induction system.
Figure 2:
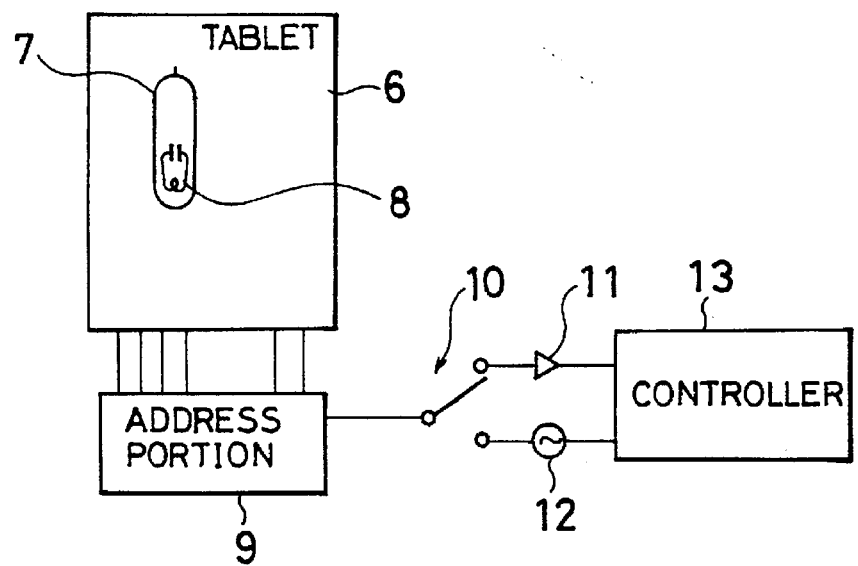
FIG. 2 is a view showing a tablet of an electromagnetic giving-receiving system.
Figure 3:
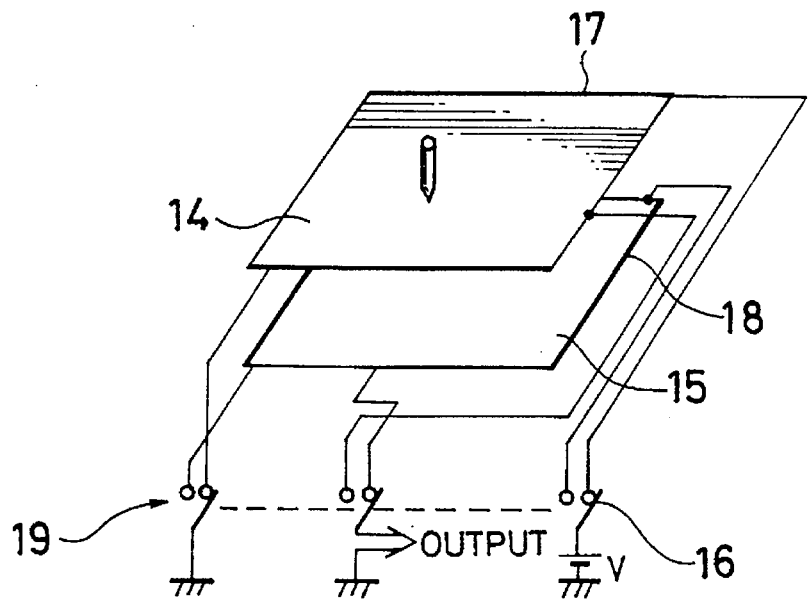
FIG. 3 is a view showing a tablet of a resistance pressure sensitive system.
Figure 4:
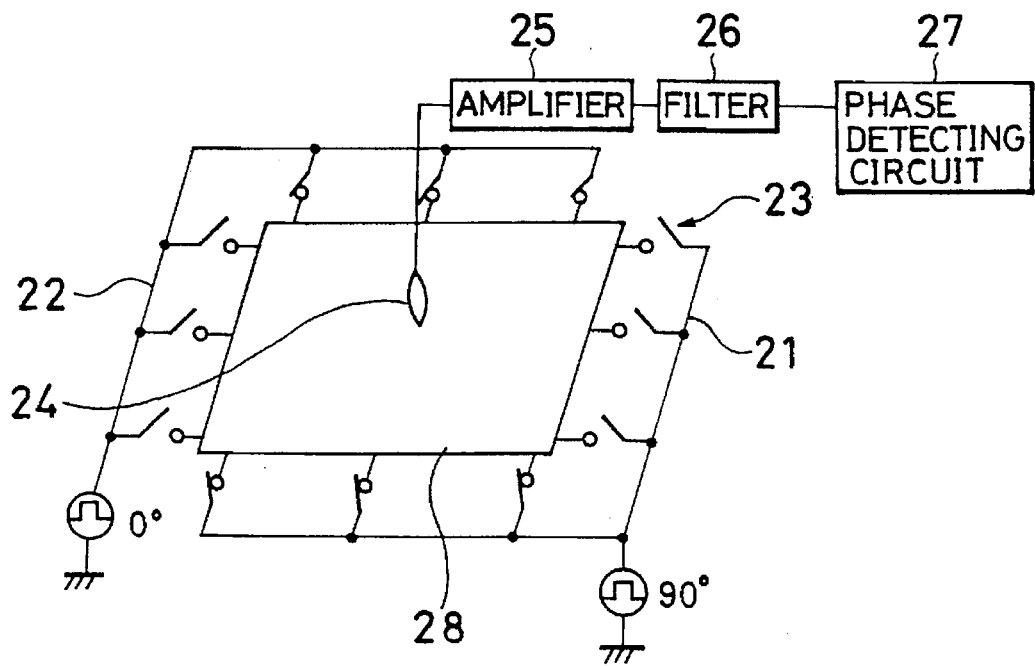
FIG. 4 is a view showing a tablet of an electrostatic coupling system.
Figure 5:
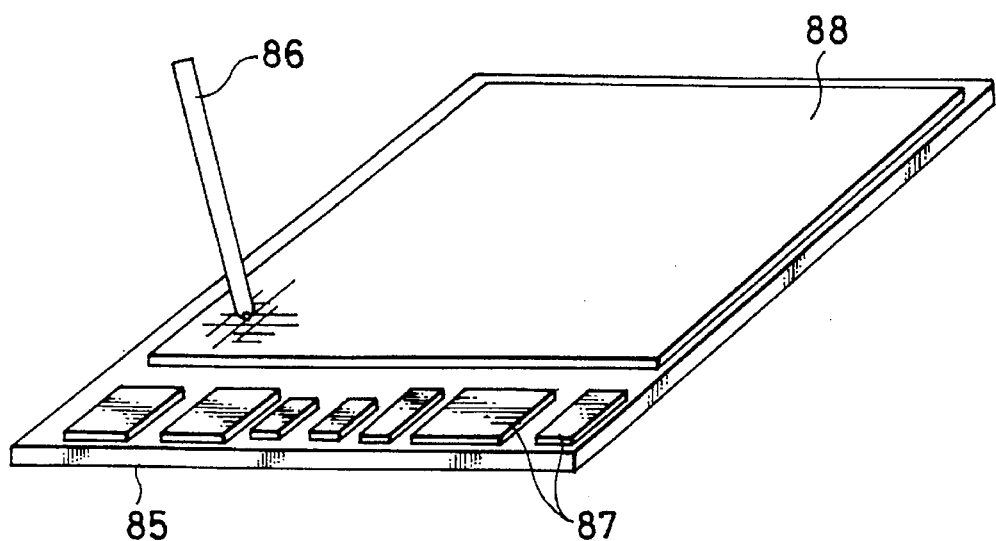
FIG. 5 is a perspective view showing a display unit of an input integral type in accordance with one embodiment of the present invention.

In contrast to this, a light leaking portion is also formed by etching in an end portion of the optical waveguide on the glass substrate in the Y-axis direction. A photosensor on the silicon substrate is arranged below this light leaking portion and is opposed to this light leaking portion. FIG. 5 shows an entire structure of the display unit of an input integral type in the present invention. In FIG. 5, reference numerals 85, 86 and 88 respectively designate a silicon monocrystal substrate, an optical pen and a glass substrate.

The liquid crystal used in the present invention is manufactured as ZLI-2327 by MERK Corporation and is constructed by a liquid crystal of a guest-host type including a black coloring matter. A chiral substance is added to the liquid crystal and d/p (p: spiral pitch, d: thickness of cell) is adjusted and set to 4. The liquid crystal uses a display mode of a white tailer type in which a wall surface is vertically oriented.

A laser is built-in the optical pen through a computer constructed as a peripheral device as shown in FIG. 11. When a handwriting operation of this optical pen is performed, a preferably handwriting function of the optical pen is fulfilled.

As mentioned above, an optical waveguide is integrally formed in the shape of a matrix and approximately guides light having a predetermined wavelength in parallel with a display substrate surface. Accordingly, the position of an optical pen can be detected by an inputting operation thereof. Further, the optical waveguide having the matrix shape can be formed between display picture elements so that a numerical aperture in display can be improved. Further, various kinds of processing circuits such as a handwriting position detecting circuit, a character recognizing circuit, etc. can be integrated on a glass substrate or a silicon monocrystal substrate so that a very compact display unit can be realized.

In accordance with the present invention, in a general system for laminating a tablet with a display panel, it is possible to solve the problems with respect to thickness, weight and power consumption of the display unit, an accuracy in display position in accordance with a parallax, wireless of the optical pen and bad influences of changes in environment of magnetic and electrostatic fields on display. Accordingly, the present invention can be widely applied to various kinds of office automation (OA) equipments using a computer such as a lap top personal computer, a word processor, etc. In particular, the display unit of an input integral type in the present invention can be most effectively used for a compact portable remote terminal such as a palm top computer, an electronic pocket notebook, etc.

Many widely different embodiments of the present invention may be constructed without departing from the spirit and scope of the present invention. It should be understood that the present invention is not limited to the specific embodiments described in the specification, except as defined in the appended claims.

What is claimed is:

1. A display unit of an input integral type having a liquid crystal display panel and an optical inputting means for inputting a light, said liquid crystal display pane comprising:
   a first substrate having a plurality of picture element electrodes thereon;
   a second substrate arranged so as to oppose to said first substrate and having a common electrode thereon for driving liquid crystal with said picture element electrodes;
   a plurality of first light waveguides arranged in parallel with each other for guiding said light inputted by said optical inputting means; and
   a plurality of second light waveguides arranged in parallel with each other so as to cross with said first light waveguides respectively for guiding said light inputted by said optical inputting means;
   said first light waveguides and said second light waveguides being arranged on an inner face of one of said first substrate and said second substrate,
   said optical inputting means inputting said light to one or a series of said first light waveguides and to one or a series of said second light waveguides simultaneously, so as to indicate a position thereof.

2. A display unit according to claim 1, wherein said first light waveguides and said second light waveguides are arranged on an inner face of said first substrate.

3. A display unit according to claim 1, wherein said first light waveguides and said second light waveguides are arranged on an inner face of said second substrate.

4. A display unit according to claim 1, wherein each of said first and second light waveguides does not overlay on said picture element electrode.

5. A display unit according to claim 1, wherein at least one of said first and second substrates is constructed by a silicon monocrystal.

6. A display unit according to claim 1, wherein said display unit further comprises a plurality of first photo sensing means formed on one end of said first light waveguides, each first photo sensing means for sensing a light, inputted by said light inputting means, and a plurality of second photo sensing means formed on one end of said second light waveguides, each second photo sensing means for sensing a light inputted by light inputting means.

7. A display unit according to claim 1, wherein said optical inputting means is adapted to repeat a turn-on state and a turn-off state at a predetermined frequency and a predetermined light intensity.

8. A display unit according to claim 1, wherein said optical inputting means is adapted to emit a light having a light spot, the diameter of which becomes greater as said optical input means is strongly pushed.

9. A display unit according to claim 1, wherein said optical inputting means comprises a light emitting diode or a laser.

10. A display unit according to claim 1, wherein said optical inputting means is adapted to emit a light having a predetermined wavelength.

11. A display unit according to claim 10, wherein said optical inputting means is adapted to emit a light which is separated from a dominant wavelength of the circumferential light.

12. A display unit according to claim 1, wherein said optical inputting means is wireless and separated from said liquid crystal display panel.

13. A display unit of an input integral type having a liquid crystal display panel and an optical inputting means for inputting a light, said liquid crystal display panel comprising:
   a first substrate having a plurality of picture element electrodes thereon;
   a second substrate arranged so as to oppose to said first substrate and having a common electrode thereof for driving liquid crystal with said picture element electrodes;
   a plurality of first light waveguides arranged on an inner face of said first substrate in parallel with each other for guiding said light inputted by said optical inputting means; and
   a plurality of second light waveguides arranged on an outer face of said first substrate in parallel with each other so as to cross with said first light waveguides respectively for guiding said light inputted by said optical inputting means;
   said optical inputting means inputting said light to one or a series of said first light waveguides and to one or a series of said second light waveguides simultaneously, so as to indicate a position thereof.

14. A display unit according to claim 13, wherein said one of said first substrate and said second substrate is said first substrate.

15. A display unit according to claim 13, wherein each of said first and second light waveguides does not overlay on said picture element electrode.

16. A display unit according to claim 13, wherein at least one of said first and second substrates is constructed by a silicon monocrystal.

17. A display unit according to claim 13, wherein said display unit further comprises a plurality of first photo sensing means formed on one end of said first light waveguides, each first photo sensing means for sensing a light, inputted by said light inputting means and a plurality of second photo sensing means formed on one end of said second light waveguides, each second photo sensing means for sensing a light inputted by light inputting means.

18. A display unit according to claim 13, wherein said optical inputting means is adapted to repeat a turn-on state and a turn-off state at a predetermined frequency and a light intensity.

19. A display unit according to claim 13, wherein said optical inputting means is adapted to emit a light having a light spot, the diameter of which becomes greater as said optical input means is strongly pushed.

20. A display unit according to claim 13, wherein said optical inputting means comprises a light emitting diode or a laser.

21. A display unit according to claim 13, wherein said optical inputting means is adapted to emit a light having a predetermined wavelength.

22. A display unit according to claim 21, wherein said optical inputting means is adapted to emit a light which is separated from a dominant wavelength of the circumferential light.

23. A display unit according to claim 13, wherein said optical inputting means is wireless and separated from said liquid crystal display panel.

24. A display unit of an input integral type having a liquid crystal display panel and an optical inputting means for inputting a light, said liquid crystal display panel comprising:

a first substrate having a plurality of picture element electrodes thereon;

a second substrate arranged so as to oppose to said first substrate and having a common electrode thereof for driving liquid crystal with said picture element electrodes;

a plurality of first light waveguides arranged on an inner face of said first substrate in parallel with each other for guiding said light inputted by said optical inputting means; and a plurality of second light waveguides arranged on an inner face of said second substrate in parallel with each other so as to cross with said first light waveguides for guiding said light inputted by said optical inputting means;

said optical inputting means inputting said light to one or a series of said first light waveguides and to one or a series of said second light waveguides simultaneously, so as to indicate a position thereof.

25. A display unit according to claim 24, wherein each of said first and second light waveguides does not overlay on said picture element electrode.

26. A display unit according to claim 24, wherein at least one of said first and second substrates is constructed by a silicon monocrystal.

27. A display unit according to claim 24, wherein said display unit further comprises a plurality of first photo sensing means formed on one end of said first light waveguides, each first photo sensing means for sensing a light, inputted by said light inputting means, and a plurality of second photo sensing means formed on one end of said second light waveguides, each second photo sensing means for sensing a light inputted by light inputting means.

28. A display unit according to claim 24, wherein said optical inputting means is adapted to repeat a turn-on state and a turn-off state as a predetermined frequency and a predetermined light intensity.

29. A display unit according to claim 24, said optical inputting means adapted to emit a light having a light spot, the diameter of which becomes greater as said optical input means is strongly pushed.

30. A display unit according to claim 24, wherein said optical inputting means comprises a light emitting diode or a laser.

31. A display unit according to claim 24, wherein said optical inputting means is adapted to emit a light having a predetermined wavelength.

32. A display unit according to claim 31, wherein said optical inputting means is adapted to emit a light which is separated from a dominant wavelength of the circumferential light.

33. A display unit according to claim 24, wherein said optical inputting means is wireless and separated from said liquid crystal display panel.

* * * * *